(12) United States Patent
Khalife

(10) Patent No.: US 12,554,339 B2
(45) Date of Patent: *Feb. 17, 2026

(54) ADAPTIVE CHORD TYPING SYSTEM

(71) Applicant: Microsoft Technology Licensing, LLC, Redmond, WA (US)

(72) Inventor: Dany Khalife, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,943

(22) Filed: Oct. 29, 2024

(65) Prior Publication Data
US 2025/0053244 A1  Feb. 13, 2025

Related U.S. Application Data

(63) Continuation of application No. 18/062,563, filed on Dec. 6, 2022, now Pat. No. 12,164,703.

(60) Provisional application No. 63/351,086, filed on Jun. 10, 2022.

(51) Int. Cl.
G06F 3/023 (2006.01)

(52) U.S. Cl.
CPC ................... G06F 3/0235 (2013.01)

(58) Field of Classification Search
CPC .... G06F 3/0219; G06F 3/0235; H03M 11/04; H03M 11/12
See application file for complete search history.

(56) References Cited

U.S. PATENT DOCUMENTS

| | | | |
|---|---|---|---|
| 8,359,543 B2 * | 1/2013 | Sengupta | G06F 40/274 715/702 |
| 10,037,088 B2 * | 7/2018 | Skogsrud | G06F 3/0235 |
| 12,164,703 B2 * | 12/2024 | Khalife | G06F 3/0235 |
| 2016/0004325 A1 * | 1/2016 | Roe | G06F 3/04886 345/168 |

* cited by examiner

*Primary Examiner* — Franklin D Balseca
(74) *Attorney, Agent, or Firm* — Schwegman Lundberg & Woessner, P.A.

(57) ABSTRACT

Examples provide an input device for an adaptive chord typing system. An input device includes a plurality of keys and a chord manager in firmware or software on the device. The chord manager analyzes input words and identifies frequently input candidate words. The chord manager automatically generates recommended chords that are shorter than the identified candidate words to serve as a shortcut during typing. The recommended chords are output to a user via a user interface communicatively coupled to the input device. If the user accepts a recommended chord, the chord is mapped to a corresponding frequently input word. When the user types a mapped chord using the keys on the input device, the input device generates keystroke data corresponding to the corresponding frequently input word(s), as if the user had actually input the word(s) rather than the chord to increase typing speed.

20 Claims, 10 Drawing Sheets

ADAPTIVE CHORD TYPING SYSTEM

CROSS-REFERENCE TO RELATED APPLICATION

This application is a continuation of prior U.S. patent application Ser. No. 18/062,563, filed on Dec. 6, 2022, which claims priority to U.S. Provisional Patent Application No. 63/351,086, entitled "ADAPTIVE CHORD TYPING SYSTEM," filed on Jun. 10, 2022, the disclosures of which are incorporated herein by reference in their entireties.

BACKGROUND

A person can typically speak or think much faster than they can type. Some text editor applications provide two or three suggested word choices based on general commonly used words and the character that the user is currently typing. The application automatically inserts a selected word into the text if the user selects one of the suggested words.

SUMMARY

Some examples provide a system and method for adaptive typing chords. The system includes a plurality of keys on an input device. The plurality of keys represent a plurality of characters. A chord manager analyzes a plurality of input words generated by a user during a predetermined time-period. The chord manager identifies a word from the plurality of input words with a frequency of occurrence that exceeds a threshold frequency, indicating that the identified word is frequently input by the user. The chord manager generates a recommended chord having a fewer number of characters than the identified word. The chord manager maps the recommended chord to the identified word upon receipt of a user-acceptance of the recommended chord. The chord manager triggers transmission of keystroke data corresponding to the identified word when the chord manager receives keystroke data corresponding to the mapped chord.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
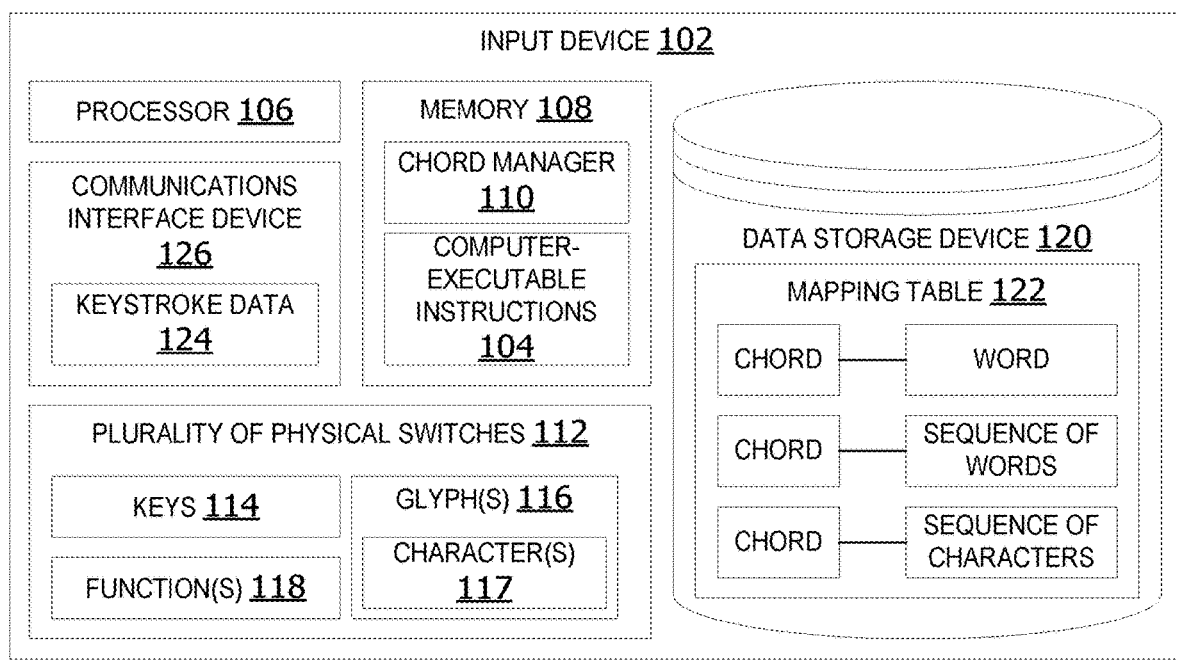
FIG. 1 is an exemplary block diagram illustrating an input device for adaptive chord typing.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

People typically type slower than they speak or think, which can make the typing experience frustrating and inefficient. Some devices used by stenographers include specialized keys and layouts, typically involving a separate keyboard device for each hand to increase typing speed and efficiency. However, these types of devices require special training to operate, making them impractical for most users. Text editor applications are available which automatically generate words for insertion into text as the user is typing. However, the user still has to take time to review the words, determine if the correct word is displayed and then select that word for insertion. Moreover, the suggested words are generalized to commonly used words at large, which is less likely to be helpful for a particular user. These systems fail to provide specialized vocabulary or terminology which a specific user commonly employs but which is not typically utilized by the average person. In such cases, this solution requiring user review and selection of words for insertion further slows the typing process, potentially causing additional delays and negating intended benefits. Thus, most available solutions are slow, impractical, insufficient and/or fail to significantly speed up typing speed for all users.

Referring to the figures, examples of the disclosure enable an adaptive chord typing system. A chord manager analyzes words input by a user and identifies frequently input words. Shortcut chords are automatically generated for the frequently input words. The recommended chords are presented to the user via a user interface. If the user accepts the chords or selects a recommended chord, the input device automatically programs the shortcut chords on the input device itself. When a user types a chord, the input device sends a sequence of characters for a word, sequence of words or sequence of alphanumeric characters (letters, numbers, letters, and numbers, etc.) mapped to the chord as if the mapped word or sequence of words was actually input or otherwise typed by the user. This enables faster typing speeds and more efficient and adaptive shortcut chord creation.

In other examples, the system enables creation of customized shortcut chords based on the words which each user most frequently types or inputs during utilization of an input device, such as, for example, a keyboard. This reduces the burden of user input to a computing device, tailoring content to the user device capability for faster and more efficient human-computer interaction.

Aspects of the disclosure further enable a chord manager having machine learning capability that learns from what the user types. The chord manager customizes the typing experience for an individual user based on the words and characters that a particular user most frequently types. This enables the system to grow organically, as well as permitting customization for each user.

In some examples, a chord manager executing on a processor of the input device analyzes keystrokes and identifies words most suited for creation of a shortcut typing chord. The chord manager surfaces frequently used words with a recommended shortcut key sequence to a graphical user interface. This permits an individual user of the particular input device to select desired shortcut chords while discarding unsuitable or unwanted suggested chords for greater flexibility and user-configurability.

In still other examples, mapped chords are stored on the physical input device itself. This provides greater security by maintaining the chords on the input device rather than on a cloud storage or a shared device.

In yet other examples, the mapped chords are stored on the physical input device for portability. This enables the user to utilize their customized shortcut chords on any device to which the user connects the input device storing the customized shortcut chords. In this manner, the user does not have to re-program their mapped shortcut chords with every different computing device.

Referring again to FIG. 1, an exemplary block diagram illustrates an input device 102 for adaptive chord typing. The input device 102 is an input interface for receiving input characters, sequences of characters, words and/or prompts. An input device includes, in some examples, a peripheral input device, an embedded or integrated device, a hand-held device, a physical keyboard, a digital keyboard, a projected keyboard, and optical keyboard, and/or a virtual keyboard.

In the example of FIG. 1, the input device 102 represents a device executing computer-executable instructions 104 (e.g., as application programs, operating system functionality, or both) to implement the operations and functionality associated with the input device 102. In some examples, the input device 102 has at least one processor 106 and a memory 108.

The input device 102 is a device permitting a user to enter input, including text-based input. A user enters input into the input device 102 via a plurality of keys associated with one or more alphanumeric characters, punctuation marks, symbols, functions, etc. The input device 102 can include, without limitation, a keyboard, a stenographic device, a virtual reality headset generating a virtual keyboard, an augmented reality headset generating a virtual keyboard, or any other type of input device. An input device can include a hardware keyboard, a digital keyboard and/or a virtual keyboard. A word, phrase, sequence of letters, or other text can be input via the input device 102, in some examples, by pressing, activating, or otherwise engaging one or more keys using a swiping gesture across a digital or virtual keyboard, or otherwise entering input by a gesture, gaze, or other method of indicating a desired input. In some examples, the input is provided to an application, such as a gaming application, text editor or any other type of application.

The processor 106 includes any quantity of processing units and is programmed to execute the computer-executable instructions 104. The computer-executable instructions 104 is performed by the processor 106, performed by multiple processors within the input device 102 or performed by a processor external to the input device 102. In some examples, the processor 106 is programmed to execute instructions such as those illustrated in the figures (e.g., FIG. 6, FIG. 7, FIG. 8, and FIG. 9).

The input device 102 further has one or more computer-readable media such as the memory 108. The memory 108 includes any quantity of media associated with or accessible by the input device 102. The firmware, in some examples, is held in the memory 108, internal to the input device 102 (as shown in FIG. 1). In other examples, the memory 108 is external to the input device (not shown) or both (not shown).

The memory 108 stores data, such as one or more applications. The applications, when executed by the processor 106, operate to perform functionality on the input device 102. In this example, the memory 108 stores a chord manager 110. The chord manager 110 is a firmware or software component that generates and manages adaptive typing chords for customizing the input device to a particular user to provide more efficient computer-human interaction, such as faster user input.

As used herein, the term "chord" refers to a combination of two or more keys that are pressed simultaneously within a given amount of time. In other words, the keys in the chord. are pressed quickly and then released within a relatively short span of time, such as one or two seconds or fractions of a second.

In some examples, the input device includes a plurality of physical switches 112 corresponding to a plurality of keys 114. Each key in the plurality of keys 114 represent glyph(s) 116 or function(s) 118. A glyph is any type of character(s) 117, such as marks or symbols. The character(s) 117 include, for example, an alphanumeric character, punctuation mark, special character, symbol, or the like. The user types of words and/or other sequences of characters via the plurality of physical switches 112.

The chord manager 110, in some examples, analyzes the words, abbreviations, prefixes, suffixes, or other combinations of letters and numbers input by a user during a predetermined time-period. The chord manager 110 identifies a shortcut candidate within the input words. The shortcut candidate is a word or sequence of words identified by the chord manager as a word which is frequently input by a user utilizing the input device. The shortcut candidate is alternatively referred to herein as an identified word, a frequently input word, or a frequently typed word.

In this example, the shortcut candidate is a word or sequence of words that is input at a frequency that is equal to or greater than a threshold frequency. The identified candidate word(s) have a frequency of occurrence within the plurality of input words that is equal to or greater than a threshold frequency value indicating the identified word(s) are frequently typed by a particular user. In this manner, the chord manager identifies frequently input words which are commonly typed or used by a specific user rather than merely applying a pre-determined set of words which are commonly typed by users in general. Thus, the identified words are customized for each user.

The examples are not limited to creating a shortcut for a word, phrase, or sequence of words. The chords can also be used to create shortcuts for common pre-fixes, abbreviations, and sequences of letters, numbers, or other desired symbols. For example, if a user frequently types various words that have the same suffix or prefix, the system can suggest a chord for the suffix or prefix. In an example scenario, if the commonly typed words include "intermediate," "interconnected", "interpret," and other words or phrases using the prefix "inter," the chord manager recommends a shortcut chord of "nt" as a shortcut for the prefix "inter." In this example, when the user types "nt," the chord manager outputs "inter." Likewise, the chord "gm" can represent "good morning." Whenever the user types the letters "gm," the words "good morning" are output in response.

The threshold frequency is a configurable value. In a non-limiting example, a shortcut candidate includes one of the most frequently input words entered by a user via a particular input device. In this example, the list is a fixed number of entries. However, the examples are not limited to a fixed number of chords in the list. In other examples, the number of items in the list are user-configurable and adjustable based on memory space availability. In other words, the number of chords that can he saved is dependent on the amount of memory available and/or the amount of memory allocated to the list. The allocated memory, in this example, is limited to achieve a balance between performance of the device and typing speed. The more chords that are stored, the greater the system resource consumption and time required for processing the typed chords and/or generating new chord recommendations.

The threshold frequency, in this examples, is a user-configurable threshold which can be created and/or modified by the user. In other examples, the threshold frequency is a pre-configured or default threshold value. In still other examples, the threshold frequency is an adaptive frequency that is automatically updated based on a feedback loop that learns over time to increase or decrease the threshold based on the user selections of shortcuts over time. A machine learning component can be included to adaptively update the threshold.

In other examples, the chord manager generates a recommended chord for each shortcut candidate. The recommended chord includes fewer number of characters than the shortcut candidate word or phrase.

As one non-limiting example, if the frequently input word identified as a shortcut candidate is "delivered," the recommended chord might be "DR" However, if the chord manager recognizes that the user frequently inputs the abbreviation "DR" for the word "doctor," the chord manager recommends a different chord, such as, "DV" or "DEL."

The chord manager presents the recommended chord and frequently input word (shortcut candidate) to the user via a user interface communicatively coupled to the input device 102. If the user accepts the recommendation, and/or the chord manager receives a user selection of the recommended chord, the chord manager 110 maps the recommended chord to the shortcut candidate. The chords are mapped to a word, phrase, or other sequence of characters in the mapping table 122. The mapped chords in the mapping table 122 can be stored in a data storage on the input device, such as, but not limited to, the data storage device 120.

The data storage device 120 can include one or more different types of data storage devices, such as, for example, one or more rotating disks drives, one or more solid state drives (SSDs), and/or any other type of data storage device. The data storage device 120 in some non-limiting examples includes a redundant array of independent disks (RAID) array. In other examples, the data storage device 120 includes a database. In this example, the data storage device includes a mapping table 122 for storing the chord mapping.

The mapping table 122 is a table in a database for mapping chords to frequently input words. In this example, a chord can be mapped to a single word, a chord can be mapped to a sequence of words and/or a chord can be mapped to a sequence of characters.

The data storage device 120 in this example is included within the input device 102, attached to the input device, plugged into the input device, or otherwise associated with the input device 102. If a user types a chord mapped to a word, sequence of words or other sequence of characters in the mapping table, the chord manager 110 triggers transmission of keystroke data 124 associated with the mapped word, sequence of words or other sequence of characters to the device communicatively coupled to the input device.

Keystroke data 124 is data including an identification of each key selected, activated, pressed, or otherwise engaged by the user. Keystroke data for a single keystroke identifies a single key selected by the user. For example, if the user types the word "in," the keystroke data includes data identifying the keys associated with the letters "i+n" or other data identifying these two letters in the correct sequence or combination of the letters as they were typed.

In some examples, the input device 102 optionally includes a communications interface component 126. The communications interface component 126 includes a network interface card and/or computer-executable instructions (e.g., a driver) for operating the network interface card. Communication between the input device 102 and other devices, such as but not limited to a computing device running an application, can occur using any protocol or mechanism over any wired or wireless connection. In some examples, the communications interface component 126 is operable with short range communication technologies such as by using near-field communication (NFC) tags and/or BLUETOOTH®.

The chord manager 110 optionally includes a machine learning component that includes pattern recognition, modeling, or other machine learning algorithms to analyze input words and/or database information to identify frequently input words and/or generate customized chords for a user.

In this nonlimiting example, the input device includes a physical keyboard having a plurality of physical/mechanical switches. The input device can also include joystick type of key switches that can be pressed in multiple directions. Those mechanical switches have multiple electrical circuits associated with them and can dose either 0, 1 or 2 circuits at any given time.

However, the examples are not limited to physical switches. In other examples, the input device includes a plurality of optical switches corresponding to the plurality of keys. An optical switch is a device that opens or closes an optical circuit. In still other examples, the switches can be implemented as software switches, such as those associated with virtual or electronic keyboards. Thus, the switches on the input device can include mechanical, software, optical, optomechanical, electric or any other available type of switch.

Figure 2:
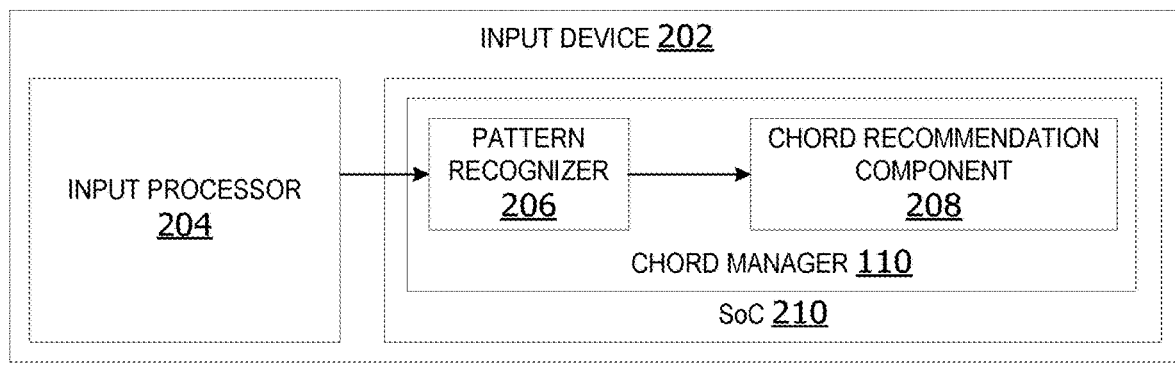
FIG. 2 is an exemplary block diagram illustrating the typing device including a chord manager for adaptive chord typing.

FIG. 2 is an exemplary block diagram illustrating the input device 202 including a chord manager 110 for adaptive chord typing. The input device 202 is a device for typing words, such as, but not limited to, the input device 102 in FIG. 1.

In this example, the input device 202 includes an input processor 204 that receives a signal or input from one or more switches as a user presses or otherwise engages/activates one or more of the keys on the input device. The switch can be a physical/mechanical switch, an optical switch, a digital/software switch, or any other type of switch.

The input processor converts the analog signal into a digital signal which can be processed by a pattern recognizer 206 component. The pattern recognizer 206 component is a software or firmware component that analyzes the keystroke data identifying which words or characters are input by the user to identify the most frequently input words or phrases within a predetermined time-period. A frequently used word which is a minimum length (minimum number of characters) and is not itself an abbreviation or already mapped to a shortcut is identified as a shortcut candidate.

A chord recommendation component 208 generates recommended chords for each of the shortcut recommendations. The chord recommendation component can include one or more rules for generating a chord recommendation. In some examples, the chord recommendation component iterates through the letters and/or characters in a frequently typed word to identify an abbreviation of the word which can be used as a chord. The chord recommendation component combines letters from the shortcut candidate in different combinations until a suitable combination is found. For example, the word "crane" has four letters. The chord recommendation component can recommend chords such as "CR", "CA", "CN", or "CE", by iteratively combining the letter "c" with each of the remaining letters in the word.

In other examples, combinations of characters that are commonly used as an abbreviation are discarded as potential chords. Likewise, any abbreviations which the chord manager identifies as abbreviations used by a given user are also disqualified by the chord recommendation component. For example, if a chord is being generated for the word "manager," the chord recommendation component recommends a chord having the letters "MR" or "MG." The letters "MR" are frequently used as an abbreviation for "mister." Therefore, this letter combination is discarded, in this example.

In other examples, the chord recommendation component 208 does not generate a chord for words that fail to reach a minimum threshold length. For example, the word "in" only has two letters. If the minimum threshold length is three characters, the word "in" is too short for a chord recommendation.

The chord recommendation component sends the recommended chords to an application running on a computing device communicatively coupled to the input device 202 via a wired or wireless communications. The application displays the shortcut candidates and recommended chords as text on a display device (screen), such as, but not limited to, a text editor application. If the user rejects a recommended chord, the chord recommendation component 208 can optionally generate additional alternative chord recommendations.

Figure 3:
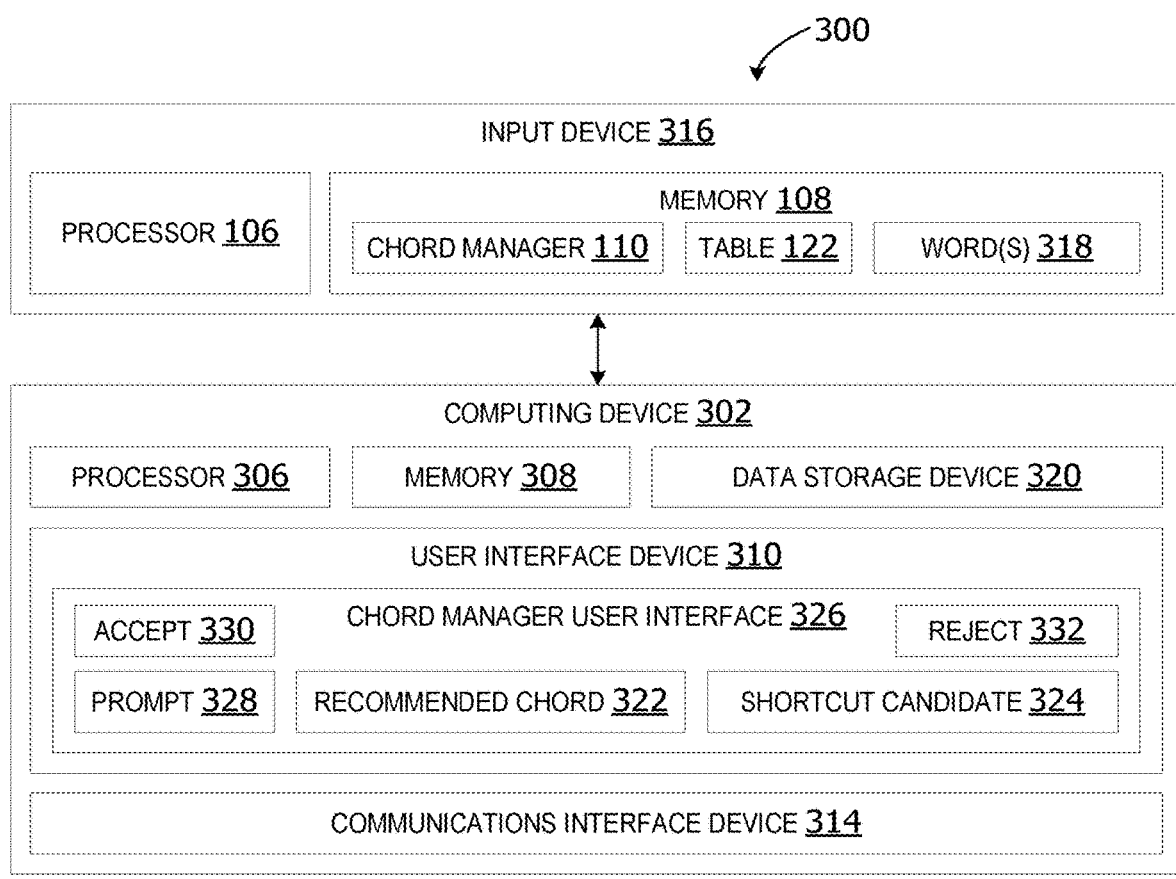
FIG. 3 is an exemplary block diagram illustrating a system for adaptive chord typing.

FIG. 3 is an exemplary block diagram illustrating a system 300 for adaptive chord typing. In the example of FIG. 3, a computing device 302 represents any device executing computer-executable instructions to implement operations and functionality. The computing device 302 in some examples includes a mobile computing device or any other portable device. A mobile computing device includes, for example but without limitation, a hand-held device, mobile telephone, laptop, tablet, computing pad, netbook, gaming device, wearable, and/or portable media player. The computing device 302 can also include less portable devices such as servers, desktop personal computers, kiosks, or tabletop devices. Additionally, the computing device 302 can represent a group of processing units or other computing devices.

In some examples, the computing device 302 has at least one processor 306 and a memory 308. The computing device 302 in other examples includes a user interface device 310. The processor 306 includes any quantity of processing units.

The memory 308 includes any quantity of media associated with or accessible by the computing device 302. The memory 308 in these examples is internal to the computing device 302 (as shown in FIG. 1). In other examples, the memory 308 is external to the computing device (not shown) or both (not shown). The memory 308 can include read-only memory.

The memory 308 stores data, such as one or more applications. The applications, when executed by the processor 306, operate to perform functionality on the computing device 302. The applications can communicate with counterpart applications or services such as web services accessible via a network. In an example, the applications represent downloaded client-side applications that correspond to server-side services executing in a cloud.

In other examples, the user interface device 310 includes a graphics card for displaying data to the user and receiving data from the user. The user interface device 310 can also include computer-executable instructions (e.g., a driver) for operating the graphics card. Further, the user interface device 310 can include a display (e.g., a touch screen display or natural user interface) and/or computer-executable instructions (e.g., a driver) for operating the display. The user interface device 310 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 302 in one or more ways.

In some examples, the system 300 optionally includes a communications interface device 314. The communications interface device 314 includes a network interface card and/or computer-executable instructions (e.g., a driver) for operating the network interface card. Communication between the computing device 302 and other devices, such as but not limited to the input device 316 and/or a remote data storage device, can occur using any protocol or mechanism over any wired or wireless connection. In some examples, the communications interface device 314 is operable with short range communication technologies such as by using near-field communication (NFC) tags.

The input device 316 is a device enabling a user to type words, such as, but not limited to, the input device 102 in FIG. 1 and/or the input device 202 in FIG. 2. The input device 316 includes at least one processor 106 and a memory 108. The chord manager 110 identifies frequently input word(s) 318, generates customized chords and stores mapped chords in the mapping table 122 on the input device 316.

The system 100 can optionally include a data storage device 3320 for storing data, such as, but not limited to, a text editor application. The data storage device 320 can include one or more different types of data storage devices, such as, for example, one or more rotating disks drives, one or more solid state drives (SSDs), and/or any other type of data storage device. The data storage device 320 in some non-limiting examples includes a redundant array of independent disks (RAID) array. In other examples, the data storage device 320 includes a database.

The data storage device 320 in this example is included within the computing device 302, attached to the computing device, plugged into the computing device, or otherwise associated with the computing device 302. In other examples, the data storage device 320 includes a remote data storage accessed by the computing device via the network, such as a remote data storage device, a data storage in a remote data center, or a cloud storage.

The chord manager 110, in some examples, transmits a recommended chord 322 for a shortcut candidate 324 for presentation to a user via a chord manager user interface 326 on the computing device 302. In some examples, the chord manager 110 triggers presentation of a prompt 328 requesting the user accept 330 or reject 332 the recommended chord 322. If the user accepts the recommended chord, the recommended chord is mapped to the shortcut candidate word(s) in the mapping table 122.

If the user rejects the recommended chord, the recommended chord is discarded. The chord manager optionally generates an alternative recommended chord, in some examples. If the user accepts the alternative recommended chord, the alternative recommended chord is mapped to the shortcut candidate 324 in the mapping table 122.

In still other examples, if the user rejects the recommended chord, the user can optionally create a customized chord for mapping to the shortcut candidate. The customized chord is a user-created sequence of characters to be used as a typing shortcut for the shortcut candidate word or sequence of words.

Figure 4:
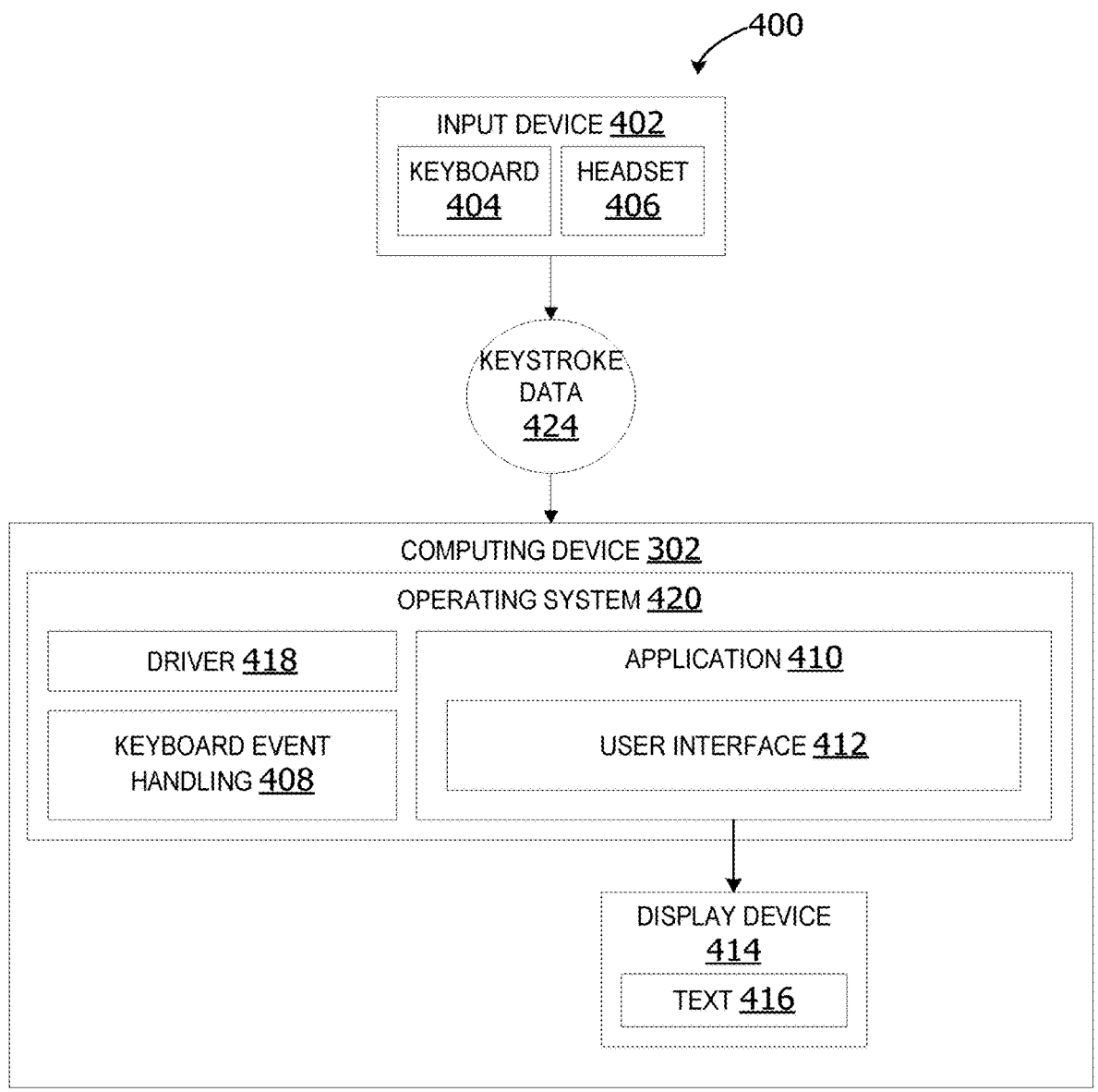
FIG. 4 is an exemplary block diagram illustrating a system for adaptive chord typing including an input device.

FIG. 4 is an exemplary block diagram illustrating a system 400 for adaptive chord typing including an input device 402. The input device 402 is a device for typing words, such as, but not limited to, the input device 102 in FIG. 1, the input device 202 in FIG. 2 and/or the input device 316 in FIG. 3. In this example, the input device 402 can be implemented as a physical keyboard 404. The keyboard 404 is a keyboard having a plurality of physical switches associated with a plurality of keys. The plurality of keys includes at least one key 403 associated with at least one character 405. The input device is alternatively implemented as a headset 406. The headset 406 can be a virtual reality headset or an augmented reality headset generating a virtual keyboard which is activated by one or more user gestures.

In some examples, if the user types a chord via the input device 402, the chord manager 110 transmits keystroke data 424 associated with a sequence of keys associated with the word or sequence of words mapped to the input chord. The keystroke data 424 is transmitted, in some examples, as a digital signal to a device driver 418 on the operating system 420 of the computing device 302 where a keyboard event handling 408 component processes the digital signal.

In other examples, an application 410 on the computing device 302 displays the recommended chords to the user via a user interface 412. The recommended chords are optionally displayed as text 416 on a display device 414 associated with the computing device.

Figure 5:
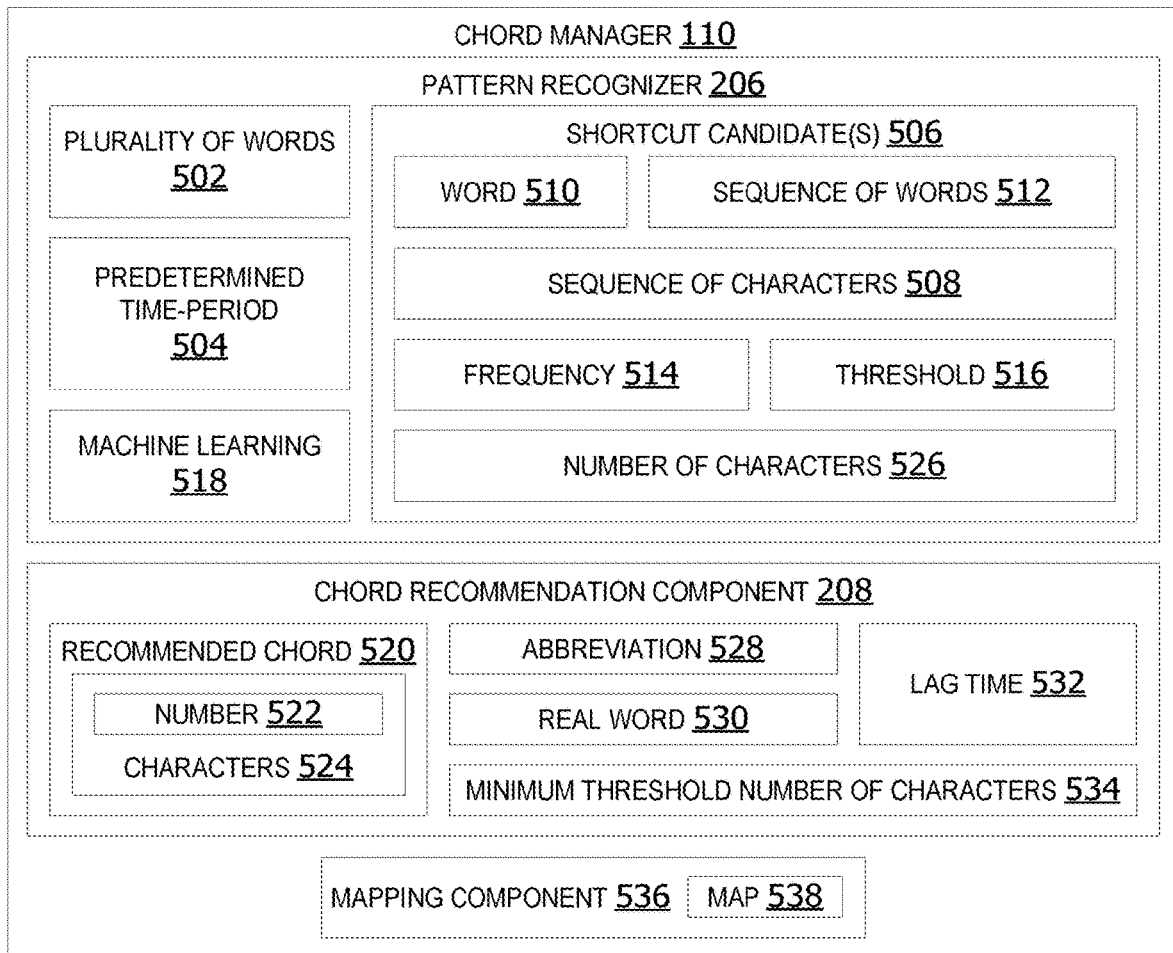
FIG. 5 is an exemplary block diagram illustrating a chord manager.

FIG. 5 is an exemplary block diagram illustrating a chord manager 110. In some examples, a pattern recognizer 206 component analyzes a plurality of words 502 input during a predetermined time-period 504. The pattern recognizer 206 identifies one or more shortcut candidate(s) 506 within the plurality of words 502 based on a result of the analysis. The shortcut candidate(s) 506 include a sequence of characters 508 within the plurality of characters representing a word 510 or sequence of words 512 having a frequency 514 that exceeds a threshold 516 frequency.

In some examples, the frequency can be a percentage frequency, such as, but not limited to, a word that is used seventy percent of the time. In other examples, the frequency is a number of times the word is used within a given time-period.

In some examples, the chord manager 110 employs a machine learning 518 to identify the frequently used words. In these examples, the machine learning utilizes pattern recognition to identify the most frequently input words within a predetermined time-period 504. The predetermined time-period 504 is any user configurable period of time. In some examples, the predetermined time-period is thirty days. In other examples, the predetermined time-period is two weeks or fourteen days. However, the examples are not limited to two weeks or thirty days. The predetermined time-period can be any amount of time.

In some examples, the chord recommendation component 208 generates a recommended chord 520 for a shortcut candidate having a number 522 of characters 524 that is less than the number of characters 526 in the shortcut candidate word(s). The recommended chord 520 in other examples is not itself an abbreviation 528 commonly used by the user. For example, if the user frequently uses the abbreviation HR for human resources, the chord manager 110 does not suggest the abbreviation HR for any frequently used words.

In other examples, the recommended chord is not a real word 530. For example, if the word "here" is a frequently used word, the chord manager does not recommend the letter "HE" as a chord because "he" is a real word which might otherwise be used by the user.

In still other examples, the recommended chord generated by the chord manager does not include any letters associated with a lag time 532. For example, if a user typically takes longer to type the letter "f" than to type one or more other letters, the chord manager avoids including the letter fin recommended chords.

In still other examples, a recommended chord is only generated for frequently input words having a minimum threshold number of characters 534. For example, if the minimum threshold number of characters is four and the word "the" is a frequently input word, the chord manager does not suggest a chord for the word because the only has three letters and fails to meet the four-character threshold. However, the examples are not limited to a threshold value of four. The threshold is a user configurable threshold value and includes any value of one or more.

In some examples, a mapping component 536 maps 538 each recommended chord accepted by the user to a corresponding word or sequence of words. The mapping component maintains a listing or mapping of the chords in a mapping table, such as, but not limited to, the mapping table 122 in FIG. 1.

Figure 6:
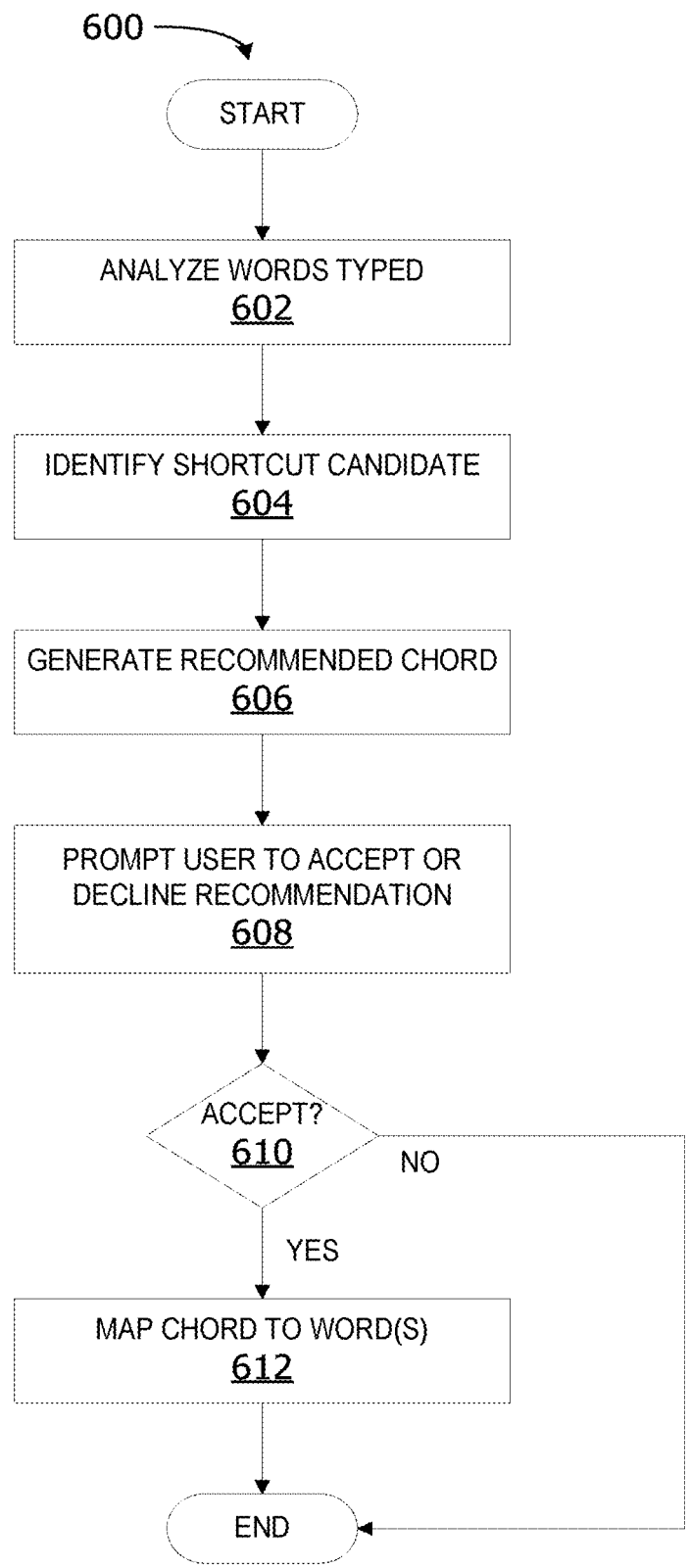
FIG. 6 is an exemplary flow chart illustrating operation of the input device for mapping customized recommended chords to frequently typed words.

FIG. 6 is an exemplary flow chart 600 illustrating operation of the input device for mapping customized recommended chords to frequently input words. The process shown in FIG. 6 is implemented by an input device, such as, but not limited to, the input device 102 in FIG. 1, the input device 202 in FIG. 2, the input device 316 in FIG. 3 and/or the input device 402 in FIG. 4.

The process begins by analyzing words input by a user during a predetermined time-period at 602. The chord manager identifies a shortcut candidate at 604. The chord manager generates a recommended chord for the shortcut candidate at 606. The chord manager prompts the user to accept or decline the recommendation at 608. If the user accepts the recommendation at 610, the chord manager maps the recommended chord to the word(s) associated with the shortcut candidate at 612. The process terminates thereafter.

The process shown in FIG. 6 is performed by a computing device, such as, but not limited to, the computing device 302 in FIG. 3. Further, one or more computer-readable storage media storing computer-readable instructions are executed to cause at least one processor to implement the operations illustrated in FIG. 6.

Figure 7:
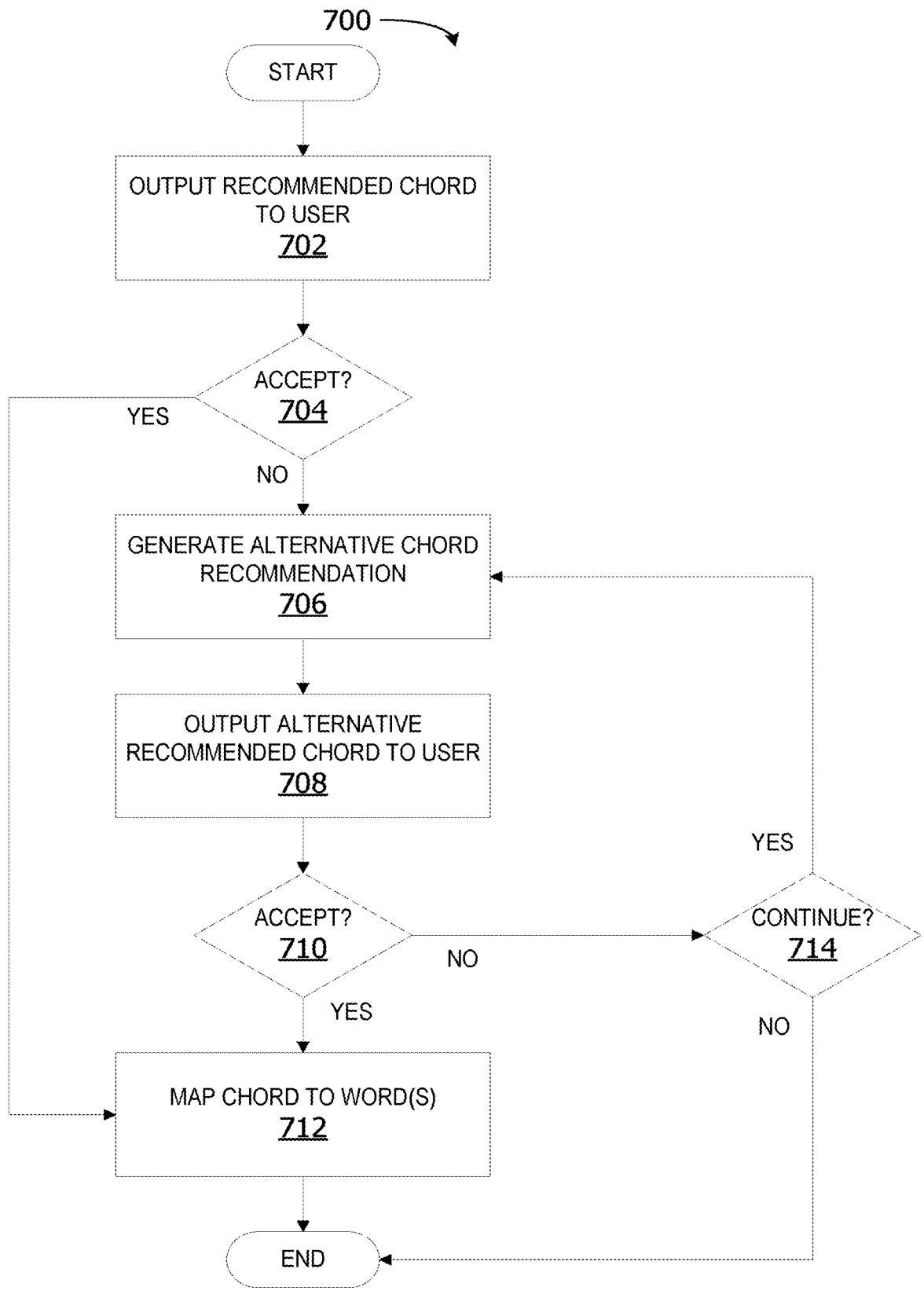
FIG. 7 is an exemplary flow chart illustrating operation of the input device for generating alternative chord recommendations.

FIG. 7 is an exemplary flow chart 700 illustrating operation of the input device for generating alternative chord recommendations. The process shown in FIG. 7 is implemented by an input device, such as, but not limited to, the input device 102 in FIG. 1, the input device 202 in FIG. 2, the input device 316 in FIG. 3 and/or the input device 402 in FIG. 4.

The process begins by outputting a recommended chord to a user at 702. If the user accepts the recommended chord at 704, the chord is mapped to the frequently input word(s) at 712. However, if the user does not accept the recommendation at 704, the chord manager generates an alternative chord recommendation at 706. The alternative chord recommendation is output to the user via the user interface at 708. If the user does not accept the alternative recommended chord at 710, a determination is made whether to continue at 714. If yes, the chord manager generates another alternative chord recommendation at 706. If the user accepts the alternative recommended chord, the chord manager maps the chord to the frequently input word(s) at 712. The process terminates thereafter.

The process shown in FIG. 7 is performed by a computing device, such as, but not limited to, the computing device 302 in FIG. 3. Further, one or more computer-readable storage media storing computer-readable instructions is executed to cause at least one processor to implement the operations illustrated in FIG. 7.

Figure 8:
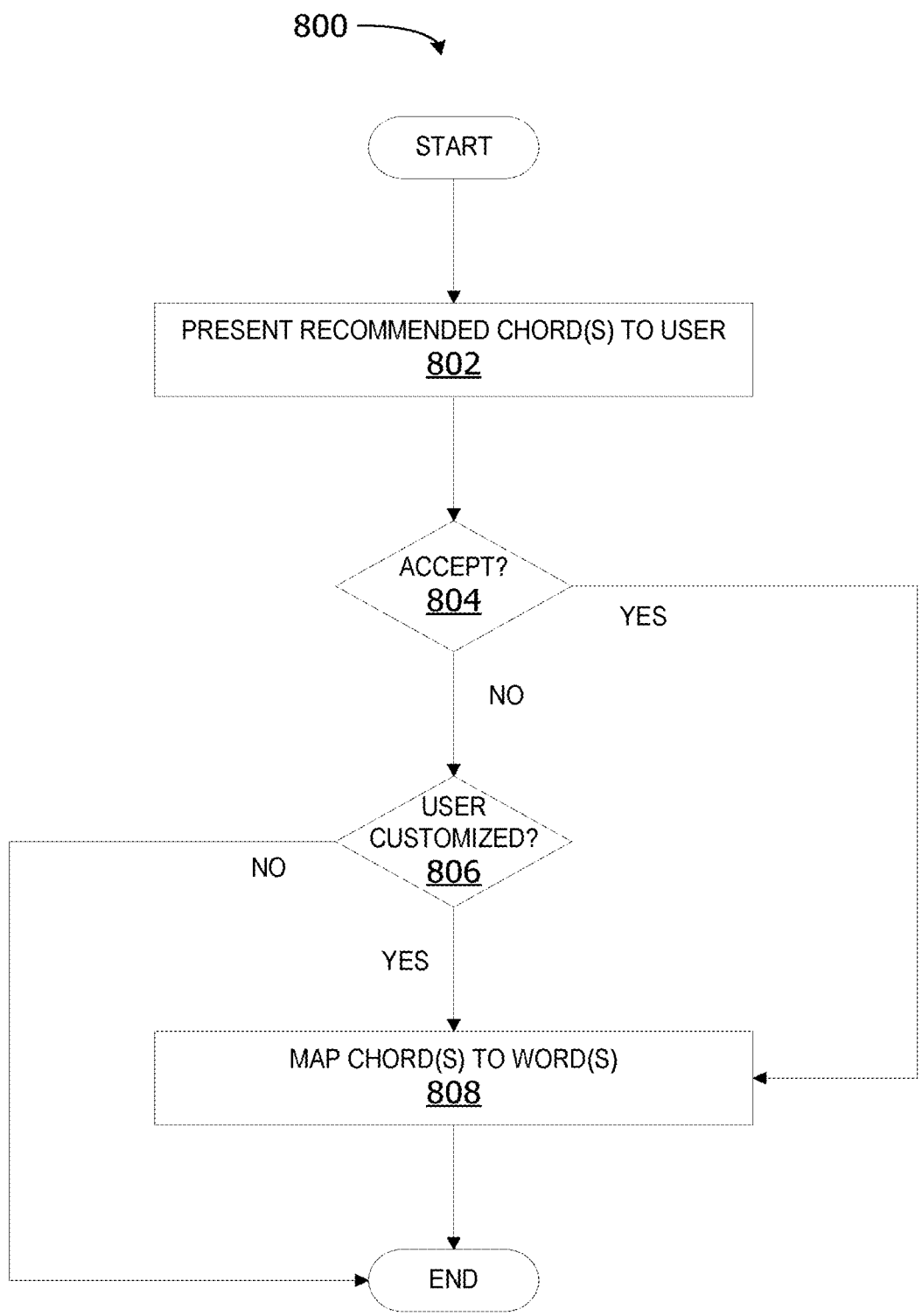
FIG. 8 is an exemplary flow chart illustrating operation of the input device for mapping chords to frequently input words.

FIG. 8 is an exemplary flow chart 800 illustrating operation of the input device for mapping chords to frequently input words. The process shown in FIG. 7 is implemented by an input device, such as, but not limited to, the input device 102 in FIG. 1, the input device 202 in FIG. 2, the input device 316 in FIG. 3 and/or the input device 402 in FIG. 4.

The process begins by presenting recommended chord(s) to the user at 802. If the user accepts one or more of the recommendations at 804, the chord manager maps the accepted chords to the frequently input word(s) at 808. The process terminates thereafter.

Returning to 804, if the user does not accept the recommended chord, the chord manager determines if a user provides a user-customized chord at 806. If yes, the chord manager maps the user-customized chord to the frequently input word(s) at 808. The process terminates thereafter.

The process shown in FIG. 8 is performed by a computing device, such as, but not limited to, the computing device 302 in FIG. 3. Further, one or more computer-readable storage media storing computer-readable instructions are executed to cause at least one processor to implement the operations illustrated in FIG. 8.

Figure 9:
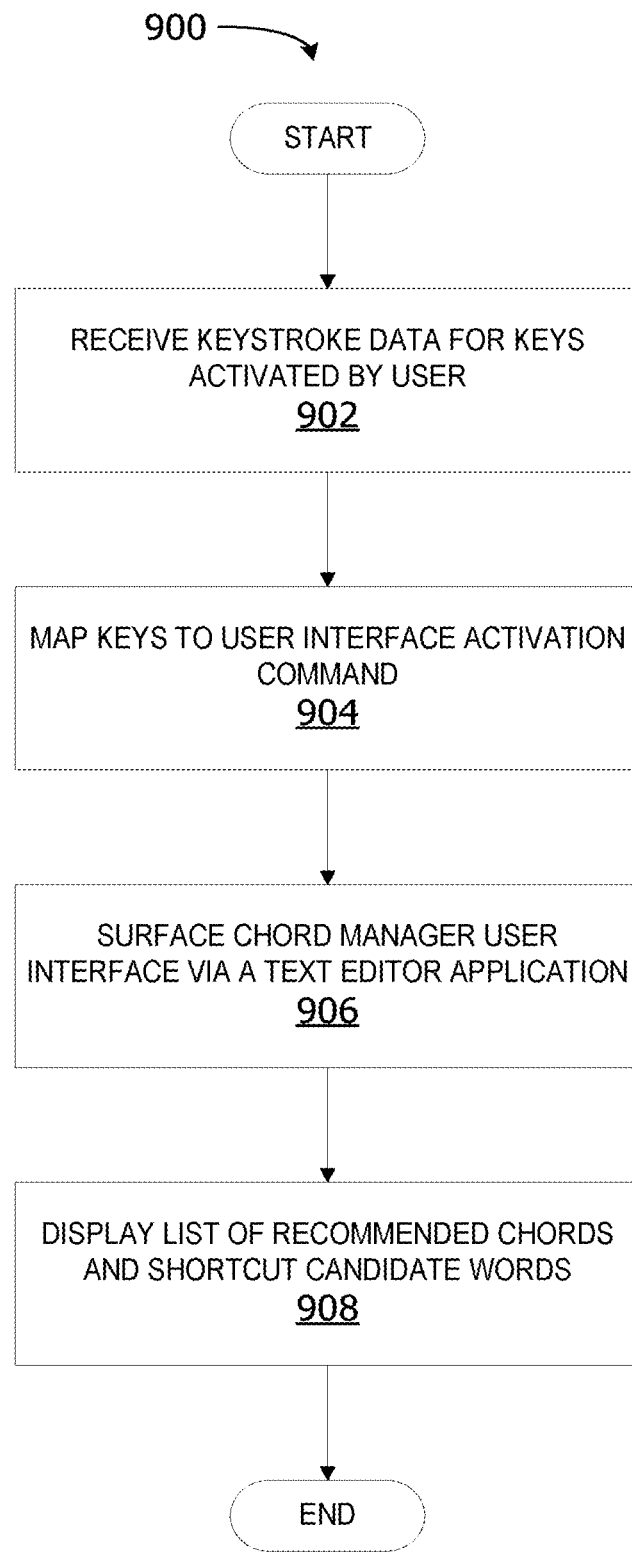
FIG. 9 is an exemplary flow chart illustrating operation of the input device for displaying a list of recommended chords to a user via a user interface.

FIG. 9 is an exemplary flow chart 900 illustrating operation of the input device for displaying a list of recommended chords to a user via a user interface. The process shown in FIG. 7 is implemented by an input device, such as, but not limited to, the input device 102 in FIG. 1, the input device 202 in FIG. 2, the input device 316 in FIG. 3 and/or the input device 402 in FIG. 4.

Keystroke data for keys activated by a user are received by the chord manager at 902. The keys are mapped to a user interface activation command at 904. The chord manager surfaces a user interface via an application, such as a text editor at 906. The chord manager displays a list of recommended chords corresponding to shortcut candidate words at 908. The process terminates thereafter.

The process shown in FIG. 9 is performed by a computing device, such as, but not limited to, the computing device 302 in FIG. 3. Further, one or more computer-readable storage media storing computer-readable instructions is executed to cause at least one processor to implement the operations illustrated in FIG. 9.

Figure 10:
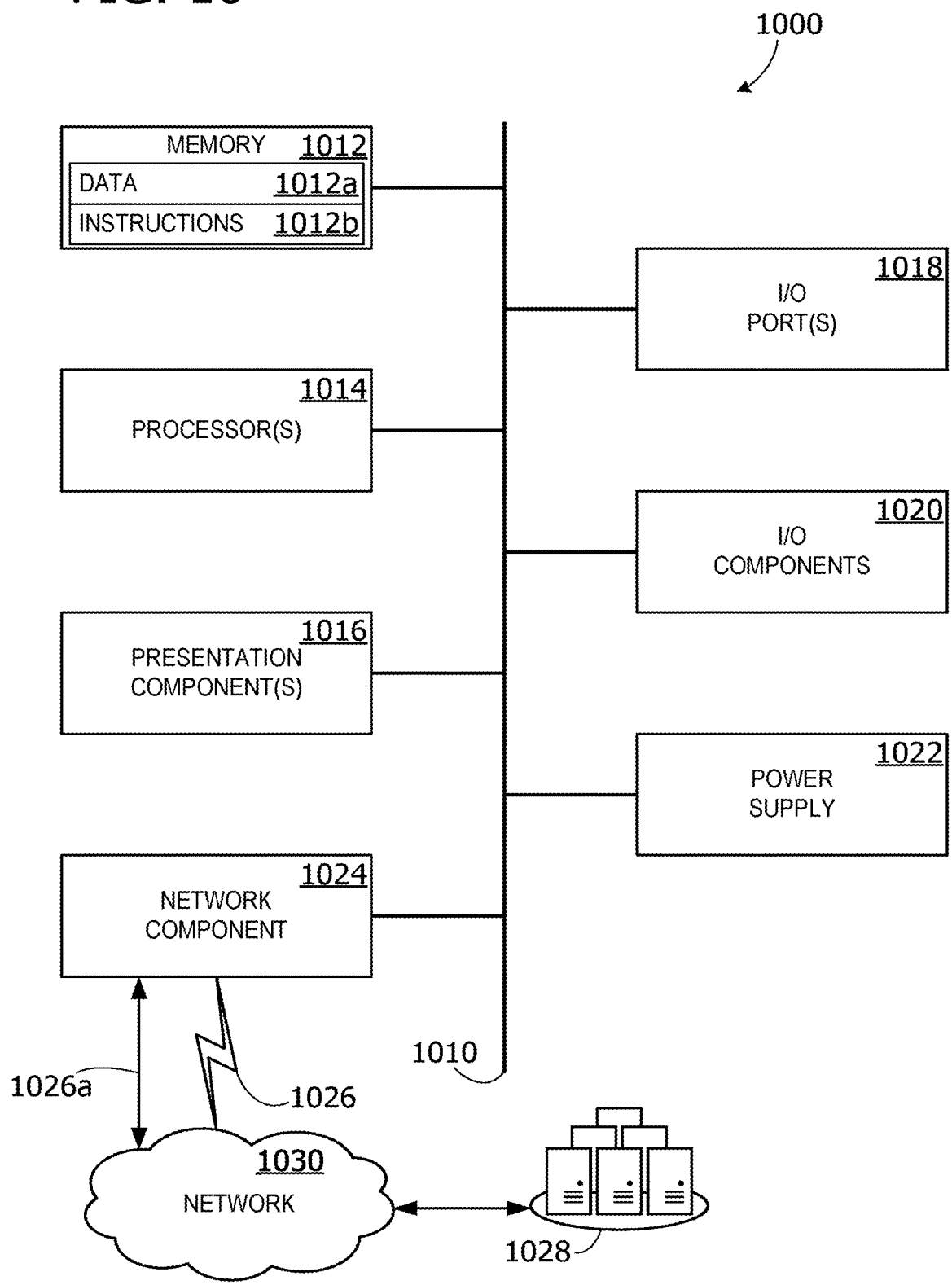
FIG. 10 is a block diagram of an example computing device for implementing aspects disclosed herein and is designated as computing device.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions are executed to cause at least one processor to implement the operations illustrated in FIG. 7.

Additional Examples

In some examples, the chord manager can be utilized with a physical keyboard as well as a virtual keyboard generated by an augmented reality or virtual reality headset.

In one example, the system presents a list of most frequently used words with a frequency value indicating the frequency of the word usage with a suggested shortcut chord. If the user confirms the chord key combination to be used as a shortcut for the frequently used word or words, the selected keys flash on the keyboard indicating the hardware has programmed itself for immediate use of the new key combination/shortcut.

In other examples, the chord manager can operate at the software level instead of the hardware/firmware level. In these examples, the software chord manager is uploaded onto every computing device on which the user wants to use the adaptive chord typing system. A specialized application programming interface (API) enables the chord manager to interact with the operating system on each computing device. The input device driver is updated to apply the chords and provide additional security measures to protect chord mapping data stored on the computing device.

In an example scenario, if a user frequently types the word "here," the chord manager recommends creating a shortcut chord for the word "here." The recommended chord is shorter than the original word. In this example, the recommended chord can be "HR." If the user accepts or confirms the recommendation, the keyboard flashes indicating that the programming is complete. The next time the user wants to type the word "here," the user can press the keys for H and R. In response, the chord manager on the firmware on the keyboard reads HR and sends keystroke data (input) for the word HERE to driver. As far as the driver is concerned, it is as if the user actually typed the letters H, E, R and E. The chord HR for the word "here" is located locally on the keyboard itself. Thus, this shortcut works with any computing device where the keyboard is communicatively coupled via a wired or wireless connection.

In some examples, the system automatically surfaces a list of recommended chords and frequently typed words (shortcut candidates) at a regular interval or at an occurrence of an event, such as a predetermined time-period. In other examples, the list is output to the user in response to a user command entered on the keyboard via one or more of the keys on the keyboard. The list can be static or dynamic. Moreover, the list in other examples, can be scrollable using UI mechanisms, such as with arrow keys, a scroll bar depending, a joystick controller device or other mechanism.

In an example, if the command to display the recommended chords is control-alt-x, the user can trigger display of the list on a user interface or text editor by typing the keys for control-alt-x on the keyboard while the keyboard is connected to a computing device with the text editor application opened. When the system opens the text editor and prints out a formatted list, the user can navigate the list, select, accept, or reject recommendations in the list via one or more keys on the keyboard. In one example, the user presses an up-arrow key or down arrow key to move a cursor up or down through the list of recommendations. The user presses the enter key to accept or select an entry.

In other examples, a specialized keyboard or other input device includes a set of controls for utilizing the chord features. In these examples, the keyboard includes a key which the user presses to display the list of recommended chords on the user interface. The keyboard can optionally include a button or switch for deactivating the chord manager feature to turn off or turn on the adaptive chord typing function.

In one example, the chord manager outputs the top twenty most frequently typed words. In other examples, the system presents the top five most typed words, the top fifteen most typed words, or any other number of most typed words with a recommended shortcut chord for each word or sequence of words in the list.

In other examples, the system makes typing into a keyboard more personalizable by learning how a user types and identifying words most commonly typed. The system reveals, for example, the top 20 typed words typed over the past month and then suggests chords to automate the input of those words, making it particularly fast to type.

Alternatively, or in addition to the other examples described herein, examples include any combination of the following:
- prompt a user to accept a recommended chord as a shortcut for the word or sequence of words associated with the shortcut candidate via a user interface;
- map the recommended chord to the shortcut candidate if a user input accepting the recommended chord is received;
- discard the recommended chord if a user input rejecting the recommended chord is received;
- map a user-customized chord to the shortcut candidate in response to receiving a user-customized chord via the input device;
- generate an alternative recommended chord in response to receiving a user rejection of the recommended chord;
- output the alternative recommended chord to the user via the user interface for approval or rejection by the user, wherein the shortcut candidate is mapped to the alternative recommended chord if the user accepts the alternative recommended chord;
- present a list of a top twenty words typed over a previous one-month time-period;
- generate a set of recommended chords to automate input of each word in the list;
- wherein the input device is a keyboard;
- wherein the input device is a virtual reality headset or an augmented reality headset;
- discarding the recommended chord if a user input rejecting the recommended chord is received;
- receiving a user-customized chord for a shortcut candidate;
- mapping the user-customized chord to the shortcut candidate in response to receiving a user-customized chord via the input device;
- receiving user rejection of the recommended chord;
- generating an alternative recommended chord;
- prompting the user to accept or reject the alternative recommended chord via the user interface;
- mapping the shortcut candidate is mapped to the alternative recommended chord if the user accepts the alternative recommended chord;
- identifying a top twenty words typed over a previous one-month time-period;
- generate a recommended chord for each word in the top twenty words;
- output a list of the top twenty words and corresponding recommended chords to the user for acceptance or rejection, where an accepted chord is applied to automate input of each word in the list;
- identifying a top twenty words typed over a previous one-month time-period;
- generate a recommended chord for each word in the top twenty words;
- output a list of the top twenty words and corresponding recommended chords to the user for acceptance or rejection, where an accepted chord is applied to automate input of each word in the list;
- wherein a user accepts a recommended chord or creates a user-customized chord by entering a set of keystrokes at the input device, wherein a plurality of chords are saved in a data storage on the input device;
- identify a top twenty words typed over a previous one-month time-period;
- generate a recommended chord for each word in the top twenty words; and
- output a list of the top twenty words and corresponding recommended chords to the user for acceptance or rejection, where an accepted chord is applied to automate input of each word in the list.

At least a portion of the functionality of the various elements in FIG. 1, FIG. 2, FIG. 3, FIG. 4, FIG. 5, and FIG. 10 can be performed by other elements in FIG. 1, FIG. 2, FIG. 3, FIG. 4, FIG. 5 and FIG. 10, or an entity (e.g., processor 106, web service, server, application program, computing device, etc.) not shown in FIG. 1, FIG. 2, FIG. 3, FIG. 4, FIG. 5, and FIG. 10.

In some examples, the operations illustrated in FIG. 6, FIG. 7, FIG. 8, and FIG. 9 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of adaptive chord typing, the method comprising analyzing a plurality of words typed via an input device within a predetermined time-period, the input device comprising a plurality of keys representing a plurality of characters or functions; identifying a set of shortcut candidates within the plurality of words based on a result of the analysis, each shortcut candidate comprising a sequence of characters within the plurality of characters associated with a word or sequence of words having a frequency that exceeds a threshold frequency; generating a set of recommended chords corresponding to the set of shortcut candidates, each recommended chord comprising a number of characters that is less than the number of characters in the sequence of characters associated with the corresponding shortcut candidate; prompting a user to accept the set of recommended chords; and mapping each user-accepted chord in the set of recommended chords to the corresponding shortcut candidate in the set of shortcut candidates. A user typing a user-accepted chord via the input device triggers transmission of keystroke data corresponding to a set of characters corresponding to the word or sequence of words of the mapped shortcut candidate from the input device.

While the aspects of the disclosure have been described in terms of various examples with their associated operations, a person skilled in the art would appreciate that a combination of operations from any number of different examples is also within scope of the aspects of the disclosure.

The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Example Operating Environment

FIG. 10 is a block diagram of an example computing device 1000 for implementing aspects disclosed herein and is designated as computing device 1000. The computing device 1000 is a device having a processor and a memory, such as the input device 102 in FIG. 1, the input device 202 in FIG. 2, the input device 316 in FIG. 3 and/or the input device 402 in FIG. 4. In other examples, the computing device 1000 is an example of a device, such as, but not limited to, the computing device 302 in FIG. 3 and FIG. 4.

The computing device 1000 is an example of a suitable computing environment and is not intended to suggest any limitation as to the scope of use or functionality of the examples disclosed herein. Neither should computing device 1000 be interpreted as having any dependency or requirement relating to any one or combination of components/modules illustrated. Some examples disclosed herein are described in the general context of computer code or machine-useable instructions, including computer-executable instructions such as program components, being executed by a computer or other machine, such as a personal data assistant or other handheld device.

Program components including routines, programs, objects, components, data structures, and the like, refer to code that performs particular tasks, or implement particular abstract data types. The disclosed examples can be practiced in a variety of system configurations, including personal computers, laptops, smart phones, mobile tablets, hand-held devices, consumer electronics, specialty computing devices, etc. The disclosed examples are also capable of being practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, I/O ports 1018, I/O components 1020, a power supply 1022, and a network component 1024. While computing device 1000 is depicted as a single device, multiple computing devices 1000 work together and share the depicted device resources. For example, memory 1012 can be distributed across multiple devices, and processor(s) 1014 can be housed with different devices.

Bus 1010 represents one or more buses (such as an address bus, data bus, or a combination thereof). Although the various blocks of FIG. 10 are shown with lines for the sake of clarity, delineating various components can be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device."

Memory 1012 takes the form of the computer-storage media references below and operatively provide storage of computer-readable instructions, data structures, program modules and other data for computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer-storage media in the form of volatile and/or nonvolatile memory, removable or non-removable memory, data disks in virtual environments, or a combination thereof. Memory 1012 includes any quantity of memory associated with or accessible by computing device 1000. Memory 1012 is internal to computing device 1000 (as shown in FIG. 10), external to computing device 1000 (not shown), or both (not shown).

Examples of memory 1012 in include, without limitation, RAM; read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1000.

In other examples, memory 1012 is distributed across multiple computing devices 1000, for example, in a virtualized environment in which instruction processing is carried out on multiple computing devices 1000. For the purposes of this disclosure, "computer storage media," "computer storage device," "computer-storage memory," "memory," and "memory devices" are synonymous terms for computer-storage memory 1012, and none of these terms include carrier waves or propagating signaling. In some examples, the memory 1012 is a memory such as, but not limited to, the memory 108 in FIG. 1.

Processor(s) 1014 includes any quantity of processing units that read data from various entities, such as memory 1012 or I/O components 1020 and include CPUs and/or GPUs. Specifically, processor(s) 1014 are programmed to execute computer-executable instructions for implementing aspects of the disclosure. The instructions are performed by the processor, by multiple processors within computing device 1000, or by a processor external to client computing device 1000. In some examples, processor(s) 1014 are programmed to execute instructions such as those illustrated in the in the accompanying drawings.

Moreover, in some examples, processor(s) 1014 represent an implementation of analog techniques to perform the operations described herein. In one example, the operations are performed by an analog client computing device 1000 and/or a digital client computing device 1000. In some examples, the processor(s) 1014 include one or more processors, such as but not limited to, the processor 106 in FIG. 1.

Presentation component(s) 1016 present data indications to a user or other device. Exemplary presentation components include a display device, speaker, printing component, vibrating component, etc. One skilled in the art will understand and appreciate that computer data is presented in a number of ways, such as, for example, visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which can be built in. Example I/O components 1020 include, for example but without limitation, a microphone, joystick, game pad, satellite dish, scanner, printer, wireless device, etc.

Computing device 1000, in some examples, operates in a networked environment via network component 1024 using logical connections to one or more remote computers. In some examples, network component 1024 includes a network interface card and/or computer-executable instructions (e.g., a driver) for operating the network interface card. Communication between computing device 1000 and other devices occur using any protocol or mechanism over any wired or wireless connection.

In some examples, network component 1024 is operable to communicate data over public, private, or hybrid (public and private) using a transfer protocol, between devices wirelessly using short range communication technologies (e.g., near-field communication (NFC), BLUETOOTH® branded communications, or the like), or a combination thereof. Network component 1024 communicates over wireless communication link 1026 and/or a wired communication link 1026a to a cloud resource 1028 across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general purpose or special-purpose computing system environments, configurations, or devices. Examples of well-known computing systems, environments, and/or configurations that are suitable for use with aspects of the disclosure include, but are not limited to, smart phones, mobile tablets, mobile computing devices, personal computers, server computers, handheld or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices accept input from the user in any way, including, for example, from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions, in some examples, are organized into one or more computer-executable components or modules. Program modules include, but are not limited to, routines, programs, objects, components, and data structures that perform particular tasks or implement particular abstract data types.

Some aspects of the disclosure are implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and can be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements are optionally present, other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of", or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for adaptive typing chords, the system comprising:
   at least one processor;
   a plurality of keys representing a plurality of characters; and
   at least one memory comprising computer-readable instructions, the computer-readable instructions configured to cause the at least one processor to:
   identify a word from a plurality of words input via the plurality of keys;
   generate a recommended chord; and
   map the recommended chord to the identified word, wherein receipt of input first keystroke data corresponding to the mapped chord triggers transmission of second keystroke data associated with the identified word.

2. The system of claim 1, wherein identifying the word from the plurality of words is within a predetermined time-period.

3. The system of claim 2, wherein the predetermined time-period has a frequency of occurrence that exceeds a threshold frequency.

4. The system of claim 2, wherein the computer-readable instructions are further configured to cause the at least one processor to:
   present a list of frequently input words occurring over the predetermined time-period; and
   generate a set of recommended chords to automate input of each word in the list of frequently input words.

5. The system of claim 1, wherein the recommended chord comprises a number of characters that is less than a number of characters in the identified word.

6. The system of claim 1, wherein the computer-readable instructions are further configured to cause the at least one processor to:
   generate a prompt, at the system, to accept the recommended chord as a shortcut for the identified word via a user interface;
   discard the recommended chord upon receipt of a user input rejecting the recommended chord; and
   map the recommended chord to the identified word upon receipt of a user-acceptance of the recommended chord.

7. The system of claim 1, wherein the computer-readable instructions are further configured to cause the at least one processor to:
   receive a user input rejecting the recommended chord;
   receive a user-customized chord input via a user interface; and
   map the user-customized chord to the identified word.

8. The system of claim 1, wherein the computer-readable instructions are further configured to cause the at least one processor to:
   receive a user input rejecting the recommended chord;
   generate an alternative recommended chord upon receipt of the user input rejecting the recommended chord; and
   prompt the user to accept the alternative recommended chord via a user interface, wherein the identified word is mapped to the alternative recommended chord upon receipt of user-acceptance of the alternative recommended chord.

9. The system of claim 1, wherein the plurality of keys are associated with a plurality of physical switches on a keyboard.

10. The system of claim 1, wherein the plurality of keys are associated with a virtual keyboard generated via a virtual reality headset or an augmented reality headset.

11. A method for adaptive typing chords, the method comprising:
   identifying a word from a plurality of words input via a plurality of keys;
   generating a recommended chord; and
   mapping the recommended chord to the identified word, wherein receipt of input first keystroke data corresponding to the mapped chord triggers transmission of second keystroke data associated with the identified word.

12. The method of claim 11, wherein identifying the word from the plurality of words is within a predetermined time-period.

13. The method of claim 12, wherein the predetermined time-period has a frequency of occurrence that exceeds a threshold frequency.

14. The method of claim 12, comprising:
presenting a list of frequently input words occurring over the predetermined time-period; and
generating a set of recommended chords to automate input of each word in the list of frequently input words.

15. The method of claim 11, wherein the recommended chord comprises a number of characters that is less than a number of characters in the identified word.

16. The method of claim 11, comprising:
generating a prompt to accept the recommended chord as a shortcut for the identified word via a user interface;
discarding the recommended chord upon receipt of a user input rejecting the recommended chord; and
mapping the recommended chord to the identified word upon receipt of a user-acceptance of the recommended chord.

17. The method of claim 11, comprising:
receiving a user input rejecting the recommended chord;
receiving a user-customized chord input via a user interface; and
mapping the user-customized chord to the identified word.

18. The method of claim 11, comprising:
receiving a user input rejecting the recommended chord;
generating an alternative recommended chord upon receipt of the user input rejecting the recommended chord; and
prompting the user to accept the alternative recommended chord via a user interface, wherein the identified word is mapped to the alternative recommended chord upon receipt of user-acceptance of the alternative recommended chord.

19. The method of claim 11, wherein the plurality of keys are associated with a plurality of physical switches on a keyboard.

20. A non-transitory computer-readable storage medium, the computer-readable storage medium including instructions that when executed by a computer, cause the computer to perform operations comprising:
identifying a word from a plurality of words input via a plurality of keys;
generating a recommended chord; and
mapping the recommended chord to the identified word, wherein receipt of input first keystroke data corresponding to the mapped chord triggers transmission of second keystroke data associated with the identified word.

* * * * *